United States Patent
Simpson et al.

(10) Patent No.: US 10,472,970 B2
(45) Date of Patent: Nov. 12, 2019

(54) GAS TURBINE ENGINE COMPONENT HAVING CONTOURED RIB END

(71) Applicant: UNITED TECHNOLOGIES CORPORATION, Hartford, CT (US)

(72) Inventors: Alex J. Simpson, Tolland, CT (US); David A. Niezelski, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 126 days.

(21) Appl. No.: 14/759,753

(22) PCT Filed: Jan. 15, 2014

(86) PCT No.: PCT/US2014/011597
§ 371 (c)(1),
(2) Date: Jul. 8, 2015

(87) PCT Pub. No.: WO2014/116475
PCT Pub. Date: Jul. 31, 2014

(65) Prior Publication Data
US 2015/0354366 A1 Dec. 10, 2015

Related U.S. Application Data

(60) Provisional application No. 61/755,692, filed on Jan. 23, 2013, provisional application No. 61/845,538, filed on Jul. 12, 2013.

(51) Int. Cl.
*F01D 5/18* (2006.01)
*F01D 5/14* (2006.01)
(Continued)

(52) U.S. Cl.
CPC ............ *F01D 5/141* (2013.01); *F01D 5/143* (2013.01); *F01D 5/147* (2013.01); *F01D 5/187* (2013.01);
(Continued)

(58) Field of Classification Search
CPC ......... F05D 2230/10; F05D 2260/2212; F05D 2260/2241; F05D 2260/22141;
(Continued)

(56) References Cited

U.S. PATENT DOCUMENTS

| 4,767,268 A | 8/1988 | Auxier et al. |
| 5,464,322 A | 11/1995 | Cunha et al. |

(Continued)

FOREIGN PATENT DOCUMENTS

| EP | 1557532 B1 | 6/2008 |
| EP | 2093376 A2 | 8/2009 |

(Continued)

OTHER PUBLICATIONS

Extended European Search Report for Application No. EP 14 74 3391 dated Oct. 21, 2016.
(Continued)

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A component according to an exemplary aspect of the present disclosure includes, among other things, a wall and at least one rib that protrudes from the wall and extends to a rib end, the rib end having a curved transition portion near a location where the at least one rib meets the wall.

16 Claims, 5 Drawing Sheets

(51) Int. Cl.
  *F01D 9/02* (2006.01)
  *F01D 25/24* (2006.01)
  *F23R 3/00* (2006.01)
(52) U.S. Cl.
  CPC ............... *F01D 5/188* (2013.01); *F01D 9/02* (2013.01); *F01D 25/24* (2013.01); *F23R 3/002* (2013.01); *F05D 2240/126* (2013.01); *F05D 2250/71* (2013.01)
(58) Field of Classification Search
  CPC .......... F01D 5/143; F01D 5/181; F01D 5/188; F01D 5/187; F01D 11/001; F01D 11/08
  USPC ........................................................ 416/97 R
  See application file for complete search history.

(56) References Cited

U.S. PATENT DOCUMENTS

| | | | |
|---|---|---|---|
| 5,472,316 A | 12/1995 | Taslim et al. | |
| 5,516,593 A | 5/1996 | Weisse et al. | |
| 5,975,851 A | 11/1999 | Liang | |
| 6,056,505 A | 5/2000 | Cunha et al. | |
| 7,137,780 B2 | 11/2006 | Liang | |
| 7,431,562 B2 | 10/2008 | Hooper et al. | |
| 8,016,547 B2 | 9/2011 | Propheter-Hinckley | |
| 2008/0050244 A1 | 2/2008 | Cherolis et al. | |
| 2009/0185893 A1* | 7/2009 | Propheter-Hinckley | F01D 5/188 415/1 |
| 2011/0033305 A1 | 2/2011 | Ahmad et al. | |
| 2012/0230833 A1 | 9/2012 | Mahler et al. | |

FOREIGN PATENT DOCUMENTS

| | | |
|---|---|---|
| EP | 2096261 A1 | 9/2009 |
| EP | 2518272 A2 | 10/2012 |

OTHER PUBLICATIONS

International Preliminary Report on Patentability for International application No. PCT/US2014/011597 dated Aug. 6, 2015.
International Search Report and Written Opinion of the International Searching Authority for International application No. PCT/US2014/011597 dated Apr. 28, 2014.

\* cited by examiner

GAS TURBINE ENGINE COMPONENT HAVING CONTOURED RIB END

BACKGROUND

This disclosure relates to a gas turbine engine, and more particularly to a gas turbine engine component having a contoured rib end.

Gas turbine engines typically include a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, numerous components of a gas turbine engine may include internal cavities that make up a cooling circuit configured to circulate a fluid for cooling the component. The cavities may be divided by ribs that extend between walls of the component. One or more of the ribs may terminate at a rib end that is generally perpendicular to the surface of the wall to create a pathway for fluids to travel. A fillet area that extends between the rib end and the wall may be susceptible to relatively high local stresses.

SUMMARY

A component according to an exemplary aspect of the present disclosure includes, among other things, a wall and at least one rib that protrudes from the wall and extends to a rib end, the rib end having a curved transition portion near a location where the at least one rib meets the wall.

In a further non-limiting embodiment of the foregoing component, the component is one of a blade, a vane, a blade outer air seal (BOAS), a combustor liner and a turbine exhaust case liner.

In a further non-limiting embodiment of either of the foregoing components, the component is a turbine airfoil.

In a further non-limiting embodiment of any of the foregoing components, the wall defines a portion of an interior cavity of a cooling circuit of the component.

In a further non-limiting embodiment of any of the foregoing components, the rib end terminates prior to another portion of the component to form a flow passage connected to the interior cavity.

In a further non-limiting embodiment of any of the foregoing components, the curved transition portion is arched.

In a further non-limiting embodiment of any of the foregoing components, the curved transition portion includes an elliptical arch.

In a further non-limiting embodiment of any of the foregoing components, the curved transition portion includes a circular arch.

In a further non-limiting embodiment of any of the foregoing components, the rib end includes a notch that defines the curved transition portion.

In a further non-limiting embodiment of any of the foregoing components, at least a portion of the curved transition portion includes a continuously varied curvature.

In a further non-limiting embodiment of any of the foregoing components, a first fillet is located between the wall and the curved transition portion.

In a further non-limiting embodiment of any of the foregoing components, a second fillet is located between a second wall and the curved transition portion, the curved transition portion extending between the first fillet and the second fillet.

A gas turbine engine according to an exemplary aspect of the present disclosure includes, among other things, a core flow path that defines a gas path of the gas turbine engine and a component that extends into the core flow path. The component includes a first wall, a second wall and a rib extending between the first wall and the second wall. The rib includes a curved transition portion extending into a body of the rib.

In a further non-limiting embodiment of the foregoing gas turbine engine, a first fillet is defined between the rib and the first wall and a second fillet is defined between the rib and the second wall.

In a further non-limiting embodiment of either of the foregoing gas turbine engines, the curved transition portion extends between the first fillet and the second fillet.

In a further non-limiting embodiment of any of the foregoing gas turbine engines, the rib includes a rib end that terminates prior to a platform of the component.

A method of reducing stress concentrations in a gas turbine engine component according to another exemplary aspect of the present disclosure includes, among other things, defining a curved transition portion at a rib end of a rib disposed inside of a component to reduce stress concentrations at a location where the rib meets a wall of the component.

In a further non-limiting embodiment of the foregoing method, the method of defining includes removing material from the rib end.

In a further non-limiting embodiment of either of the foregoing methods, the method of removing includes forming a notch in the rib end.

In a further non-limiting embodiment of any of the foregoing methods, the method of defining includes removing material from tooling used to form the component.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 1 illustrates a schematic, cross-sectional view of a gas turbine engine.

FIGS. 2A and 2B illustrate a component that can be incorporated into a gas turbine engine.

FIG. 3 illustrates a partially cut-away view of a gas turbine engine component.

FIG. 4 illustrates an exemplary rib of a gas turbine engine component.

FIG. 5 illustrates another exemplary rib.

FIG. 6 illustrates yet another exemplary rib.

FIG. 7 schematically illustrates a cross section of a portion of an exemplary gas turbine engine component.

DETAILED DESCRIPTION

This disclosure relates to a gas turbine engine component having a curved transition portion defined within the rib end. The curved transition portion is contoured to reduce stress concentrations in the component. For example, the curved transition portions of this disclosure may reduce stresses that can exist within fillet areas between the rib end and a wall from which the rib extends or other sections of the component that transition from areas having a greater amount of material to areas having less material.

Figure 1:
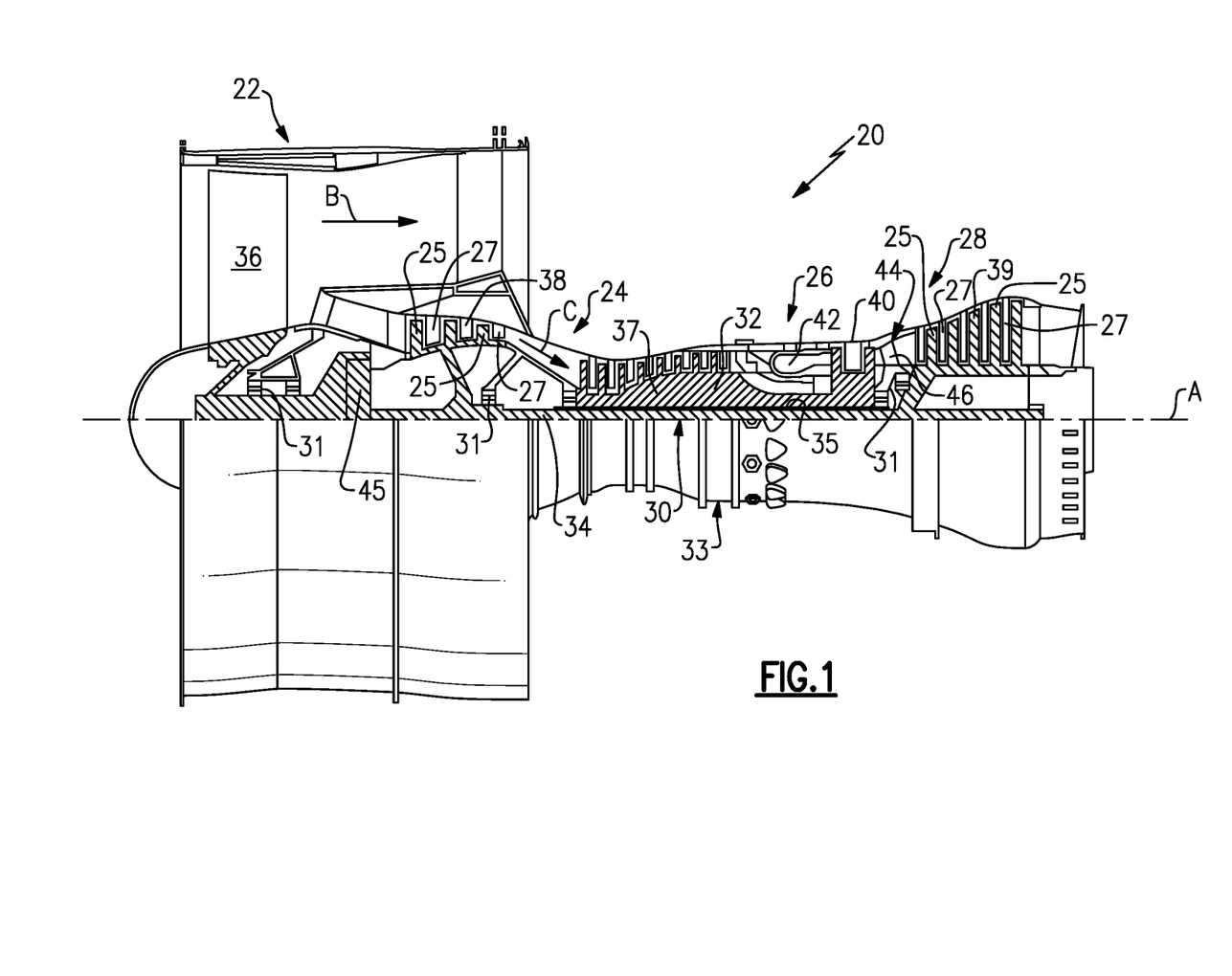

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram° R)/(518.7° R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling systems for cooling the parts during engine operation.

Figure 2A:
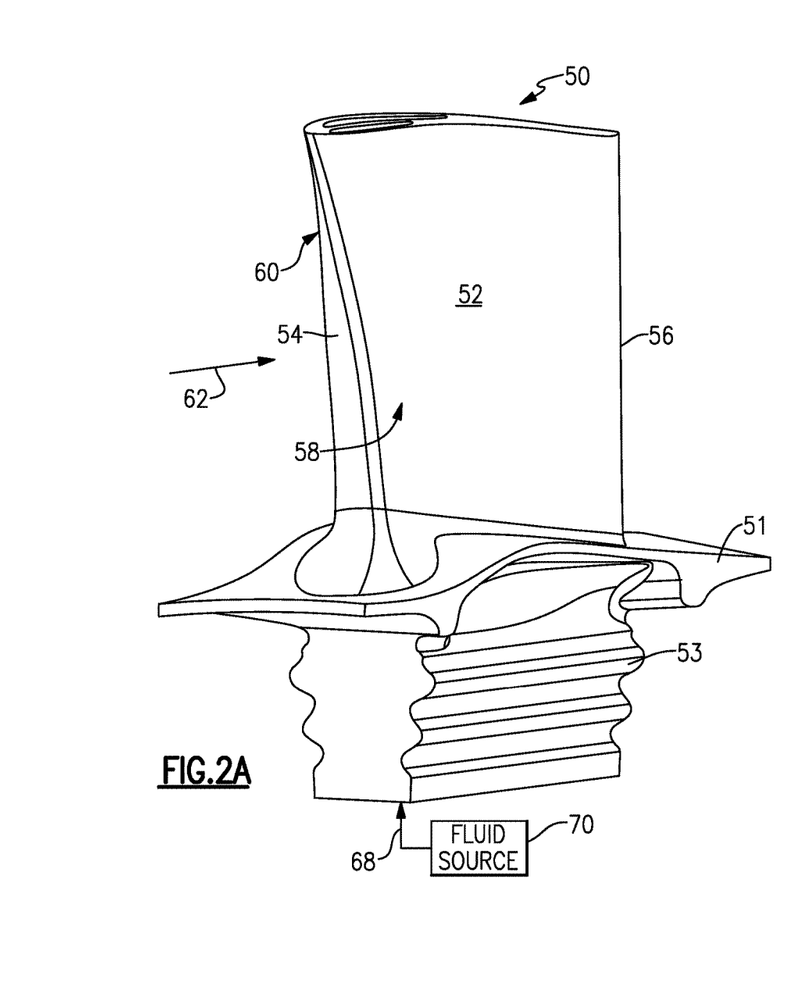
Figure 2B:
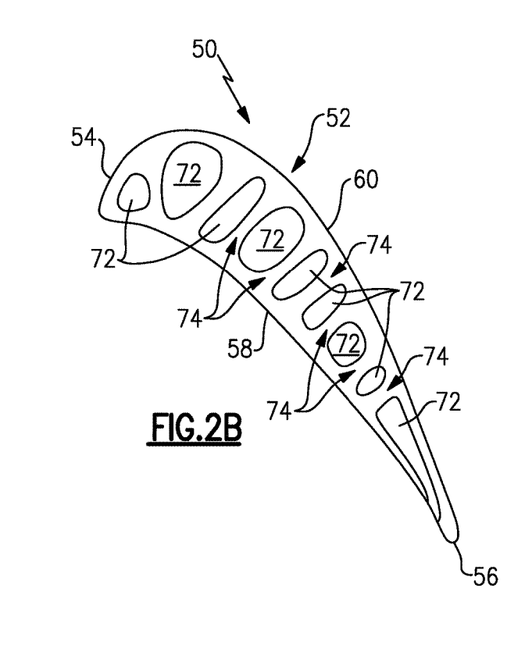

FIGS. 2A and 2B illustrate a component 50 that can be incorporated into a gas turbine engine, such as the gas turbine engine 20 of FIG. 1. In one embodiment, the component 50 is a turbine blade. However, the features of this disclosure may be incorporated into any blade, vane, blade outer air seal (BOAS), combustor liner, turbine exhaust case liner, or any other part. It should further be appreciated that any component that includes a section that transitions from an area having a greater amount of material to an area having a lesser amount of material may benefit from the teachings of this disclosure.

The component 50 includes a body 52 that axially extends between a leading edge portion 54 and a trailing edge portion 56. The body 52 may additionally include a first wall 58 (e.g., a pressure side wall) and a second wall 60 (e.g., a suction side wall) that are spaced apart from one another and that join at each of the leading edge portion 54 and the trailing edge portion 56.

In one embodiment, the body 52 is representative of an airfoil. For example, the body 52 could be an airfoil that extends from a platform 51 and a root 53 where the component 50 is a blade, or could extend between inner and outer platforms (not shown) where the component 50 is a vane. Alternatively, the body 52 could include a platform or any other section of the component 50.

A gas path 62 is communicated axially downstream through the gas turbine engine 20 along the core flow path C (see FIG. 1) in a direction that extends from the leading edge portion 54 toward the trailing edge portion 56 of the body 52. The gas path 62 represents the communication of core airflow along the core flow path C.

One or more cavities 72 (see FIG. 2B) may be disposed inside of the body 52 as part of an internal cooling circuit for cooling portions of the component 50. The cavities 72 may extend radially, axially and/or circumferentially inside of the body 52 to establish cooling passages for receiving a cooling fluid 68 that is circulated therein to cool the component 50. The cooling fluid 68 may be communicated into one or more of the cavities 72 from a fluid source 70 that is external to the component 50.

The cooling fluid 68 is generally of a lower temperature than the airflow of the gas path 62 that is communicated across the body 52. In one particular embodiment, the cooling fluid 68 is a bleed airflow that can be sourced from the compressor section 24 or any other portion of the gas turbine engine 20 that includes a lower temperature than the core airflow of the gas path 62. The cooling fluid 68 can be circulated through the cavities 72 to transfer thermal energy from the component 50 to the cooling fluid 68, thereby cooling the component 50. The cooling circuit can include any number of cavities 72, including only a single cavity. The cavities 72 may either be in fluid communication with one another or could be fluidly isolated from one another.

One or more ribs 74 (see FIG. 2B) may extend between the first wall 58 and the second wall 60 of the body 52. In one embodiment, adjacent cavities 72 of the component 50 are axially bound by ribs 74 that extend on either side of each cavity 72.

Figure 3:
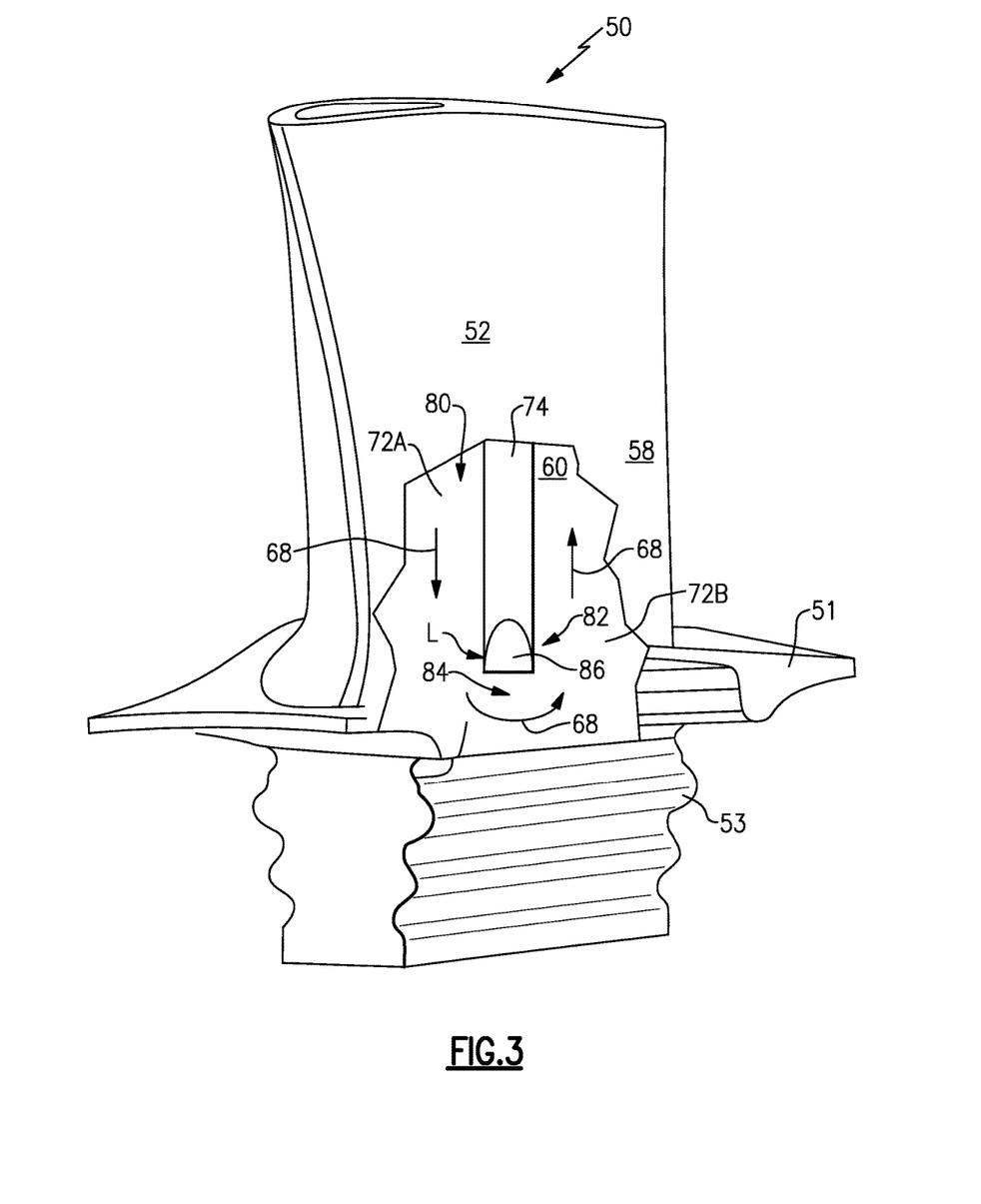

FIG. 3, with continued reference to FIGS. 2A and 2B, is a partial cut-away view of the component 50 illustrating portions of an internal cooling circuit 80. The portion removed is outlined by the first wall 58, which exposes cavities 72A and 72B of the internal cooling circuit 80 and a rib 74 that extends between the second wall 60 and the first wall 58 for ease of reference.

Figure 7:
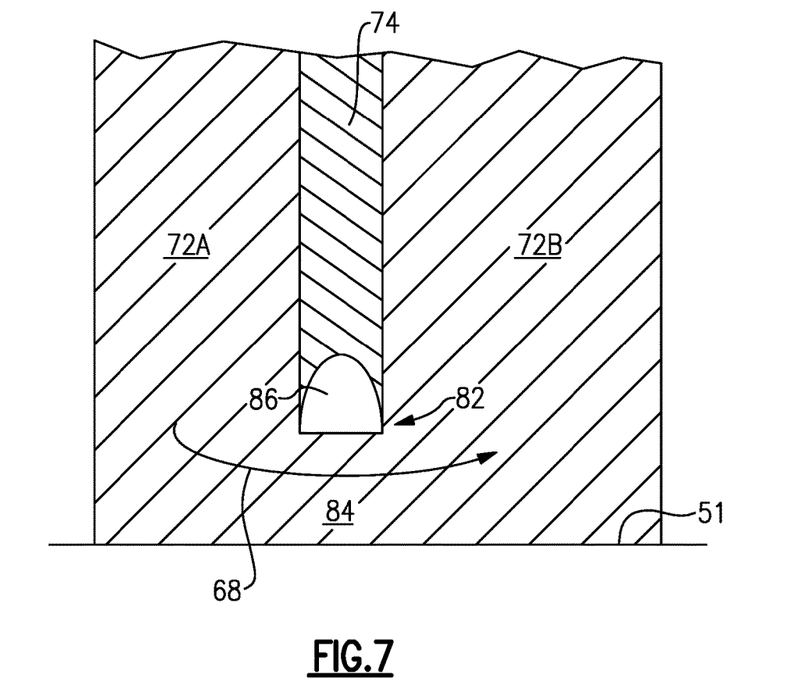

As shown schematically in FIG. 7, in one embodiment, the rib 74 terminates at a rib end 82 prior to joining the platform 51, thereby leaving a flow passage 84 that connects the cavities 72A, 72B. In other words, at least a portion of the internal cooling circuit 80 may define a serpentine path for circulating the cooling fluid 68 to cool the component 50. As discussed in greater detail below, the rib end 82 may include a curved transition portion 86 for reducing stresses in the rib end 82 at a location L where the rib 74 meets the second wall 60 (and/or the first wall 58 although the first wall 58 is shown removed in FIG. 3).

Figure 4:
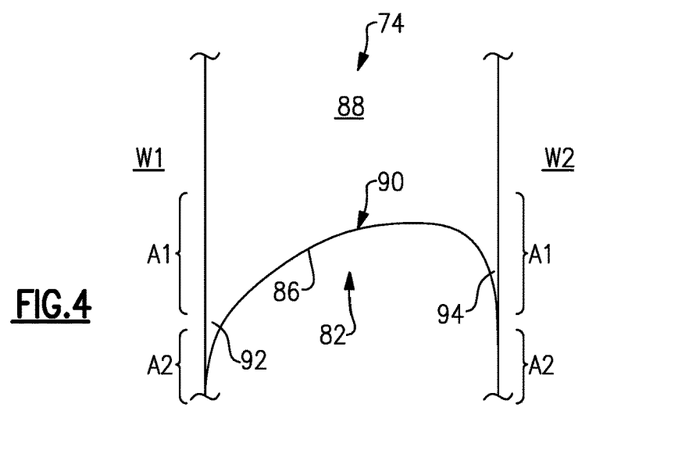

FIG. 4 illustrates an exemplary rib 74 that can be incorporated into a gas turbine engine component, including but not limited to the component 50 illustrated in FIGS. 2A, 2B and 3. The rib 74 includes a body 88 that terminates at a rib end 82. The rib 74 extends between walls W1 and W2 (or may protrude from only one of the walls W1, W2). The walls W1, W2 may be representative of the first and second walls 58, 60 of the component 50 described above, or could be any other internal or external wall of a gas turbine engine component.

The rib end 82 includes a curved transition portion 86 between the rib 74 and the walls W1, W2. In one embodiment, the curved transition portion 86 extends radially into the body 88 of the rib 74. In other words, a peak 90 of the curved transition portion 86 is plunged into the body 88 of the rib 74.

In one embodiment, the curved transition portion 86 is a circular arch. This disclosure is not limited to the exact configuration shown in FIG. 4. In fact, the size, position and geometry of the curved transition portion 86 may vary without departing from the true scope and content of this disclosure. The curved transition portion 86 may include either a constant radius or a variable radius.

A first fillet area 92 may be disposed between the rib 74 and the first wall W1 and a second fillet area 94 may be defined between the rib 74 and the second wall W2. The fillet areas 92, 94 are the locations where the rib 74 meets the walls W1, W2. In one embodiment, the curved transition portion 86 extends between the first and second fillet areas 92, 94 and is continuously curved (that is, the curved transition portion 86 includes a continuously varied curvature).

The curved transition portion 86 reduces stress concentrations that may exist in the fillet areas 92, 94, thereby reducing the susceptibility of the formation of fatigue cracks in the fillet areas 92, 94. Put another way, the curved transition portion 86 eases the stiffness transition from a first area A1 of the wall W1, W2 that includes the rib 74 and a second area A2 of the wall W1, W2 that excludes the rib 74.

Figure 5:
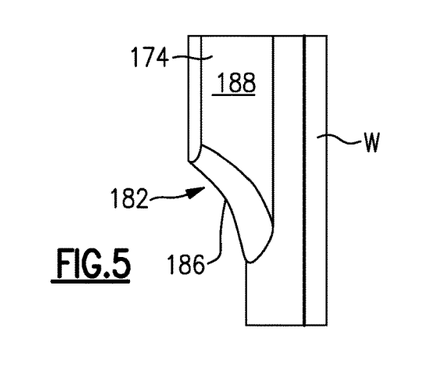

Another exemplary rib 174 is illustrated by FIG. 5. In this disclosure, like reference numerals designate like elements where appropriate and reference numerals with the addition of one-hundred or multiples thereof designate modified elements that are understood to incorporate the same features and benefits of the corresponding original elements. The rib 174 includes a body 188 that terminates at a rib end 182. The rib 174 may protrude from one or more walls W.

The rib end 182 includes a curved transition portion 186. In one embodiment, the curved transition portion 186 is an elliptical arch. This disclosure is not intended to be limited to the exact configuration shown in FIG. 5. In fact, the size, position and geometry of the curved transition portion 186 may vary without departing from the true scope and content of this disclosure. In one embodiment, the curved transition portion 186 includes a semi-major axis and a semi-minor axis that have different radii.

Figure 6:
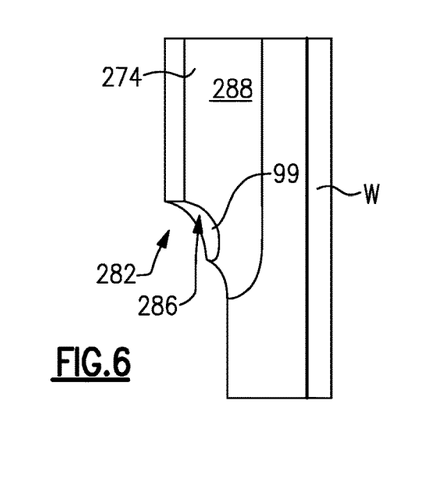

FIG. 6 illustrates yet another rib 274 that may be incorporated into a gas turbine engine component. The rib 274 includes a body 288 that terminates at a rib end 282. The rib 274 may protrude from one or more walls W. The rib end 282 includes a curved transition portion 286. In one embodiment, the curved transition portion 286 is formed by a notch 99 that can be formed in the rib end 282. The size, position and geometry of the notch 99 may vary without departing from the true scope and content of this disclosure.

The curved transition portions 86, 186 and 286 described above can be incorporated into either new or existing component designs by removing material from the rib ends 82, 182, 282. For example, the curved transition portions 86, 186 of FIGS. 4 and 5 can be implemented into new component designs by removing material from existing tooling that is used to manufacture the component. Alternatively, the curved transition portion 286 of FIG. 6 can be implemented into existing component designs by forming the notch 99 in the rib end 282 to define the curved transition portion 286.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component, comprising:
a wall defining a portion of an interior cavity of a cooling circuit of said component;
at least one rib that protrudes from said wall and extends to a rib end, said rib end having a curved transition portion near a location where said at least one rib meets said wall, said rib end terminates prior to a platform of said component to form a flow passage connected to said interior cavity;
a first fillet extending from said curved transition portion, said first fillet defining a first fillet concave portion decreasing in thickness as said first fillet concave portion extends from curved transition portion toward said platform; and
a second fillet extending from said curved transition portion, said second fillet having a second fillet concave portion decreasing in thickness as said second fillet concave portion extends from said curved transition portion toward said platform, wherein said curved transition portion defines a concave surface extending from said first fillet concave portion to said second fillet concave portion, and at least a portion of said curved transition portion includes a continuously varied curvature.

2. The component as recited in claim 1, wherein said component is one of a blade or a vane.

3. The component as recited in claim 1, wherein said component is a turbine airfoil.

4. The component as recited in claim 1, wherein said curved transition portion is arched.

5. The component as recited in claim 1, wherein said curved transition portion includes an elliptical arch extending from said first fillet.

6. The component as recited in claim 1, wherein said curved transition portion includes a circular arch extending from said first fillet.

7. The component as recited in claim 1, wherein said rib end includes a notch that defines said curved transition portion and extends from said first fillet.

8. The component as recited in claim 1, wherein the flow passage is part of a serpentine flow path.

9. The component as recited in claim 1, wherein said curved transition portion is of a constant radius extending from the first fillet to the second fillet.

10. A gas turbine engine, comprising:
a core flow path that defines a gas path of said gas turbine engine; and
a component that extends into said core flow path, said component including:
a first wall;
a second wall;
a rib extending between said first wall and said second wall, said rib including a curved transition portion extending into a body of said rib, the curved transition portion terminates prior to a platform of the component;
a first fillet extending from said curved transition portion, said first fillet defining a first fillet concave portion decreasing in thickness as said first fillet concave portion extends from said curved transition portion toward said platform; and
a second fillet extending from said curved transition portion, said second fillet having a second fillet concave portion decreasing in thickness as said second fillet concave portion extends from said curved transition portion toward said platform, wherein said curved transition portion defines a concave surface extending from said first fillet concave portion to said second fillet concave portion, and at least a portion of said curved transition portion includes a continuously varied curvature.

11. The gas turbine engine as recited in claim 10, wherein the curved transition portion forms a flow passage connected to said interior cavity, and the flow passage is part of a serpentine flow path.

12. The gas turbine engine as recited in claim 11, wherein the flow passage provides fluid communication between a first cavity configured to receive cooling fluid flowing in a first radial direction, and a second cavity configured to receive said cooling fluid flowing in a second radial direction opposite the first radial direction.

13. A method of reducing stress concentrations in a gas turbine engine component, comprising:
defining a curved transition portion at a rib end of a rib disposed inside of the component to reduce stress concentrations at a location where the rib meets a wall of the component, the rib end terminates prior to a platform of the component to form a flow passage; and
defining a first fillet extending from the wall to the curved transition portion, said first fillet defining a first fillet concave portion decreasing in thickness as said first fillet concave portion extends from said curved transition portion toward said platform; and
defining a second fillet extending from a second wall of the component to the curved transition portion, said second fillet having a second fillet concave portion decreasing in thickness as said second fillet concave portion extends from said curved transition portion toward said platform, wherein said curved transition portion defines a concave surface extending from said first fillet concave portion to said second fillet concave portion, and at least a portion of said curved transition portion includes a continuously varied curvature.

14. The method as recited in claim 13, wherein the step of defining includes removing material from the rib end.

15. The method as recited in claim 14, wherein the step of removing includes forming a notch in the rib end.

16. The method of claim 13, wherein the flow passage is part of a serpentine flow path.

* * * * *